UNITED STATES PATENT OFFICE.

ROBERT A. CHESEBROUGH, OF NEW YORK, N. Y.

COATING FOR THE PROTECTION OF BOTTOMS OF VESSELS.

SPECIFICATION forming part of Letters Patent No. 447,941, dated March 10, 1891.

Application filed November 26, 1889. Serial No. 331,693. (No specimens.)

*To all whom it may concern:*

Be it known that I, ROBERT A. CHESEBROUGH, of the city and county of New York, in the State of New York, have invented a new and useful Improvement in the Protection of Ships and other Navigable Vessels against Fouling, Corrosion, and Decay, of which the following is a specification.

This invention consists in the protection of the bottoms and other parts of ships and other navigable vessels against marine animals and plants and against the corrosive action of sea-water and against rot by means of a coating of ozocerite applied to such parts of the vessel as it may be desired to so protect.

The ozocerite may be prepared for use by simply melting it or heating it to a temperature of, say, from 140° to 150° Fahrenheit, to bring it to a sufficiently fluid state to permit it to be applied to the surface of the ship or other vessel with a brush. It should preferably be first purified of the volatile matters which are generally contained in it by subjecting it to a temperature of, say, 350° to 400° Fahrenheit, at which such volatile matters will be evaporated. It may afterward be further purified by filtration through bone-black. It should not be refined by distillation, because distillation destroys the structure and it would be converted into paraffine-wax, and would then be unfit for the purpose described, because being in a crystalline condition it would easily scale off and could be easily removed, while owing to its amorphous condition the ozocerite clings with great tenacity to the metal or wood to which it is applied and cannot be easily washed off or rubbed off.

I have found by experiment of considerable duration that ozocerite applied to an iron or wooden vessel affords an efficient protection against marine insects and plants, and also prevents the corroding action of sea-water upon the iron and protects the wood from rot. The ozocerite also gives a smooth surface that makes the vessel slip so easily through the water that for yachts what is called "pot-leading" may be dispensed with.

I have hereinabove mentioned that the ozocerite when brought to a melted or sufficiently soft state by heat may be applied to the parts of the ship or vessel to be protected by means of a brush. A brush such as is commonly used for whitewashing will serve the purpose.

The ozocerite which I use is either that formed in a natural state in the earth or such as is known as "rod-wax," obtained from the sucker-rods of oil-wells and from the settlings from the tanks containing crude petroleum.

What I claim as my invention, and desire to secure by Letters Patent, is—

The combination, with those parts of a navigable vessel which are to be submerged, of a coating of ozocerite for the purpose of protecting such parts against marine animals and plants, against the corroding action of sea-water, and against rot, substantially as herein described.

ROBERT A. CHESEBROUGH.

Witnesses:
  FREDK. HAYNES,
  D. H. HAYWOOD.